Figure 1:
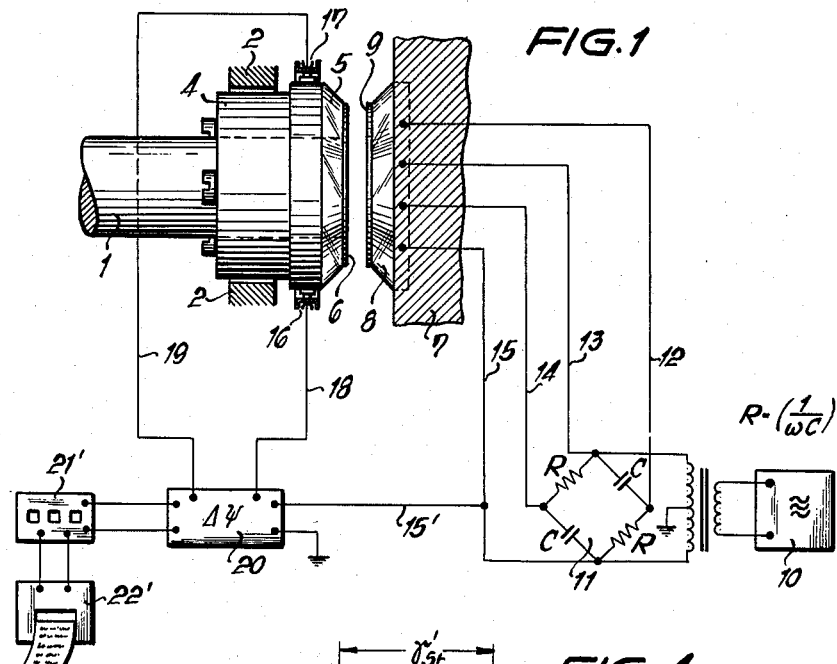

INVENTOR
Eberhard FRISCH

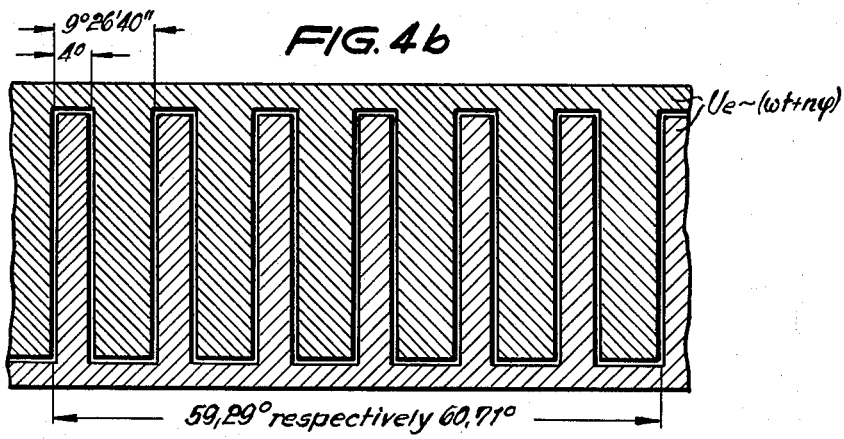
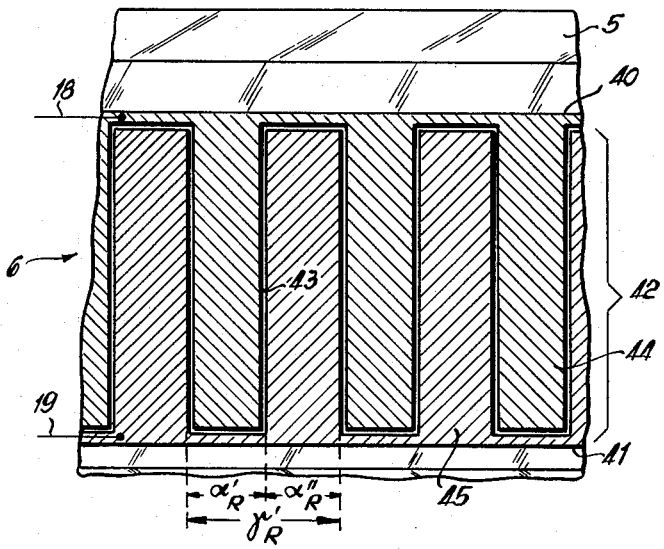
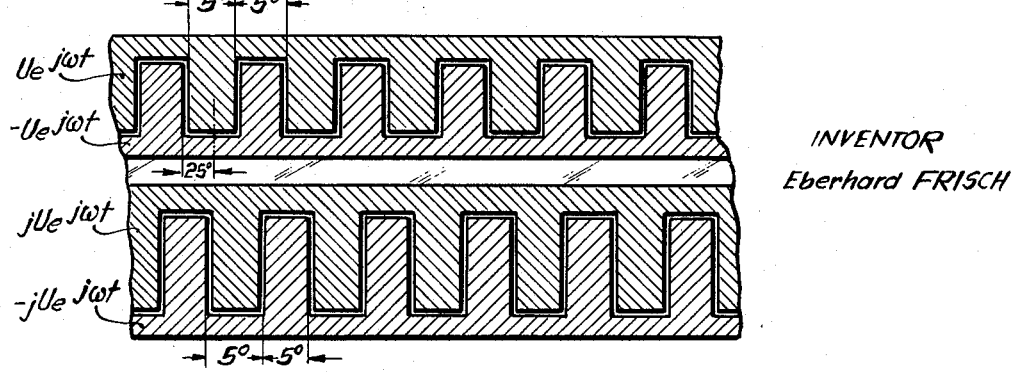
INVENTOR
Eberhard FRISCH

United States Patent Office 3,146,394
Patented Aug. 25, 1964

3,146,394
APPARATUS FOR PROPORTIONALLY CONVERTING A ROTATIONAL ANGLE INTO A PHASE ANGLE OF AN ALTERNATING VOLTAGE
Eberhard Frisch, Berlin-Waidmannslust, Germany, assignor to Continental Elektroindustrie A.G., Berlin-Mariendorf, Germany, a corporation of Germany
Filed Apr. 20, 1960, Ser. No. 23,496
Claims priority, application Germany Apr. 29, 1959
6 Claims. (Cl. 323—93)

This invention relates to transducer apparatus for proportionally converting angular displacement of a shaft, such as that of a cinetheodolite, into an electrical phase difference, particularly by means of a capacitive coupler. Devices of this type are known, for instance from the article entitled "Speeding Missile Trajectory Computation" in Control Engineering, April 1959, pages 126 and 128. As shown in said article, the shaft of the tracking telescope of a cinetheodolite has a glass disc or rotor secured thereto, in front of a rigidly mounted glass disc or stator. Both discs have patterns in copper film thereon, the rotor pattern comprising straight-sided rectangles of copper, radial of the disc and uniformly angularly spaced from one another, while the stator pattern comprises pairs of copper areas separated by a sinusoidal glass area. Alternating voltages are applied to the stator pattern to "drive" the transducer electronically. By means of electrostatic, capacitive influence, a voltage output is generated in the rotor pattern, which can be sensed with the aid of a commutator and sensing circuit, said circuit being used also to digitize, indicate and otherwise utilize the voltage output. This voltage output has substantially constant amplitude and frequency. Its phase is a function of the angular displacement of the rotor relative to the stator, this relationship being obtained by the sine wave form in the stator pattern and the radial arrangement of the rotor pattern.

Difficulties have been encountered in the use as well as in the fabrication of such transducers, and it is the object of this invention to overcome such difficulties. One important problem is connected with fringe capacitive effects, which have seriously impaired the resolving power of the transducer described above. Another serious problem lies in the fact that the precise forming of the sine wave driver pattern is difficult and expensive. Further problems, including for instance that of keeping the capacitor elements or glass discs truly parallel, will be apparent to persons skilled in the art, from a study of the disclosure of my invention, which follows.

Briefly stated, I obtain transduction from mechanical rotation angle to electrical phase angle by a fundamentally different combination of stator-rotor patterns. The new combination utilizes certain particular spacing, dimensioning and driving features of patterns which are radially arranged on the stator as well as on the rotor. In other words it dispenses with the sine-shaped stator pattern previously used. The way in which the new arrangement obtains and in fact improves a proportional phase angle output will now be described.

Figure 2:
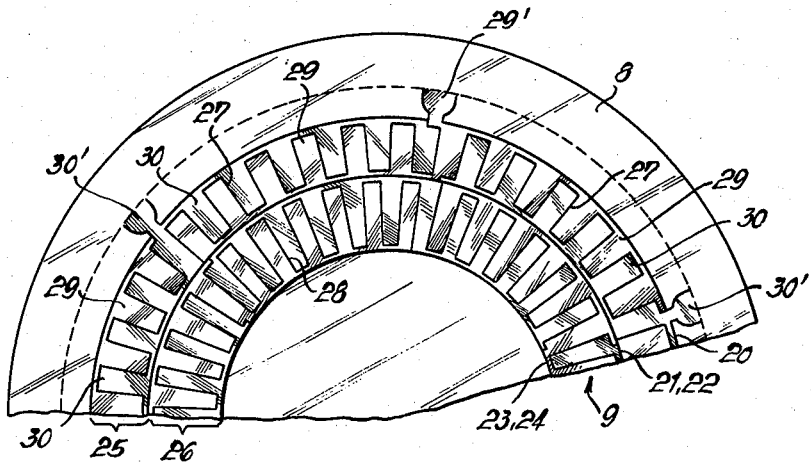
Figure 2A:
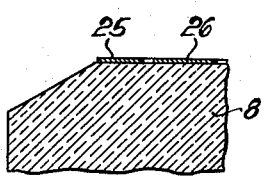
Figure 2B:
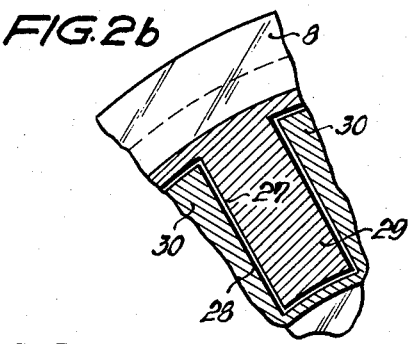
Figure 3:
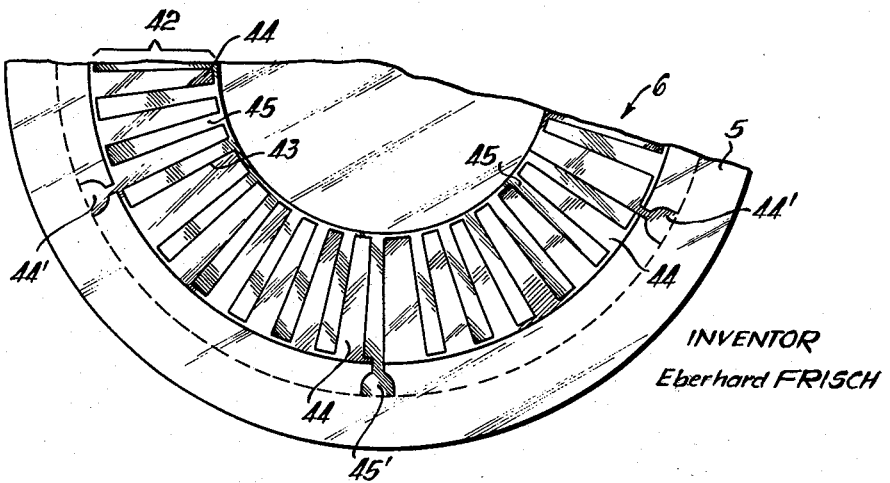

FIGURE 1 is a schematic side view of the new transducer. FIGURE 2 is a partial, schematic front view of the stator (seen from left in FIGURE 1). FIGURE 2a is a fragmentary, sectional view of the stator. FIGURE 2b is an enlarged detail from FIGURE 2. FIGURE 3 is a partial schematic rear view (from right in FIGURE 1) of the rotor. FIGURE 4 is a view similar to FIGURE 2 but covering additional areas and neglecting the curvature of the pattern. FIGURE 5 is a view similar to FIGURE 4 in presentation and to FIGURE 3 in substance. FIGURE 4a is a graph of certain basic voltage functions in the transducer. FIGURE 4b is a view similar to FIGURE 5, but illustrating a particular dimensional embodiment of the device shown in generalized form in the latter. FIGURE 5a is a view similar to that of FIGURE 4 but illustrating a particular dimensional embodiment of the device shown in generalized form in the latter.

FIGURE 1 shows at 1 a shaft, for instance of an optical tracking device or cinetheodolite. Bearing 2 engages holder 4 for a rotor unit comprising glass plate 5 with metal film 6 on the end surface thereof. At a small distance from this film, stator metal film 9 is disposed on stator glass plate 8 which is held in holder 7.

A suitable oscillator 10, desirably generating and maintaining a precise, normal frequency, is coupled to a phase adjustor unit 11 which in turn is directly connected to the stator-driver metal pattern by wires 12, 13, 14 and 15. The rotor-coupler metal pattern, on the other hand, is connected to commutator elements 16, 17 on holder 4, which are directly connected by wires 18, 19 to the electrical phase comparator 20', which also receives by wire 15' a comparison voltage from the stator-oscillator unit. The output of comparator 20', which can be digitized, is indicated at 21' and recorded at 22'.

The stator pattern, generally shown in FIGURE 2, can be formed for instance by vacuum-evaporating copper or aluminum, condensing the same on the glass plate, and removing parts of the resulting film. It comprises two annular areas 25, 26 which have equal areas (the inner area 26 therefore covers a somewhat greater part of a radius than does the outer area 25). These areas are best shown in FIGURES 2a and 2b. They have portions thereof removed, which constitute zig-zag areas 27, 28, one between every two metal areas. The resulting square wave pattern in each area 25, 26 has recess portions which in effect constitute narrow lines, radial of the glass disc, and additional recess portions, interconnecting said radial lines and which extend transversely or angularly with respect to the same. In this way area 25 is divided into two partial areas 29, 30, on the two sides of zigzag line 27, and similarly area 26 is divided into two partial areas 31, 32.

It will be noted readily by persons skilled in the art of fabrication of elements such as graduated circle carriers that the recess lines, radial of the disc, can be produced on a circle divider machine of either purely mechanical or engraving type, or of a type also employing chemical action or etching or the like, and that a high precise recess pattern can thus be produced, more easily than in case that formation of a sine wave is attempted, wherein not only periodic errors and the like are minimized but the exact relation of all parts of the pattern, around the complete circle, is fully maintained. This will be understood particularly when recent advances in the art of circle division are considered. It will also be understood that formation of the recess elements transverse of the dividing lines is a relatively easy process and which is relatively unproblematic. Once that a master disc has been fabricated in the way indicated, copies thereof can easily be made by known photochemical or photomechanical processes or the like.

The outer metal area 25 has terminals 29', 30' for connection to the respective leads, for instance 12, 14, of the driving power source. Said area 25 is divided from the inner metal area 26 of the stator-driver by an insulating area, lying between metal edges 21, 22 and which is recessed in the metal in ways similar to those used for the transverse parts of curves 27, 28.

The rotor pattern (FIGURE 3) comprises an annular area 42 divided by recess line 43 into partial areas or electrodes 44, 45. These have respectively, terminals 44', 45' to derive the alternating voltage, generated by capacitive influence in the rotor upon the driving of the stator, and to feed the same to commutator 16, 17.

In FIGURE 4 the angular distance of two radial lines in curves 27 is shown as $\gamma_{st}$, this distance being formed by the width of one metal element of partial area 29 plus the width of one of partial area 30; for present purposes it may at least initially be assumed that these elements of the partial areas have equal width. The angular distances of all radial lines in this curve 27 have the same value $\gamma_{st}$, as can be achieved by means of precision circle division; it being understood also that all radial lines have very accurately the same width. The same angular spacing is employed for curve 28 of the stator.

Assuming now, for the moment, that the corresponding angular spacing $\gamma_R$ on the rotor equals that on the stator, and assuming further that the rotor initially is in full register with the stator, it will be understood that the condenser capacity C29, 44 between partial area 29 and coupling area 44 develops in the way shown in FIGURE 4A, when the rotor is turned relative to the stator. In this figure, $n$ stands for the number of partial electrodes or elements of width $\gamma/2$ in one ring of the transducer. The initial, full register produces a maximum of capacity, which falls in a substantially straight line to a minimum as the rotor is turned by $R/n$ where R is a complete revolutioon. Continuing turning raises the capacity until a new maximum is reached when register is again established, etc. The output voltage, insofar as it derived from partial stator area 29 has accordingly a period $R/n$. Similar period is observed in that output element traceable to electrode 30, which however is displaced relative to the other by $R/2n$.

The two zigzag voltages of FIGURE 4a would provide no useful, proportional output, comparable to that hitherto obtained by means of a sinusoidal recess. However, a useful and in fact an improved output is obtained, in accordance with the invention, by means of rotor and stator electrode spacings which suitably differ from one another, while retaining the illustrated, fine recess lines 27, 28 and their radial arrangement.

According to one embodiment of the invention the rotor electrode spacing elements are of different magnitudes, which can be explained as follows. Considering for instance the pair of electrodes 29, 30 of the stator, this pair generates a rotor voltage which can be expressed as a function of the angular rotor-stator displacement by the following equation:

(A) $$U_R = \text{const} \sum_\lambda \alpha_\lambda \sin(\lambda n \varphi)$$

wherein $U_R$ is the rotor voltage, $\varphi$ is the rotor-stator displacement, and $\alpha_\lambda$ is a value which equals either $$\sin\left(\frac{\lambda n \alpha_R'}{2}\right)/\lambda^2$$

when $\lambda$ is an odd integer or equals zero when $\lambda$ is an even integer. It will now be seen that angle $\alpha'_R$ can be selected so that the following condition is fulfilled (B) $$\lambda n \alpha'_R = 2k\pi$$

wherein $k$ is any desired positive integer. It will further be seen that when condition B is fulfilled the function A is free from all harmonics of order $\lambda$ or of any multiple of $\lambda$.

According to another embodiment the rotor and stator spacing $\gamma'_R$, $\gamma'_{st}$ are differently selected. It is then possible by suitable dimensioning of $\gamma'_R$ to achieve condition C:

(C) $$m\lambda n \gamma'_R = q 2\pi$$

wherein $m$ is an integer and $q$ is a positive integer other than $m$, $2m$, $3m$, etc.

It can readily be shown by further mathematical analysis, which is not believed to be required at this point although it has been given in the original application of April 25, 1959, disclosing this invention, that the indicated arrangements, in accordance with the invention, allow the generation of a rotor voltage which varies, no longer in the zigzagging or cornered way of FIGURE 4a but in the substantial form of a sine wave, as is desired for proportionality of phase angle and rotational angle; this generated voltage being further characterised by the feature that undesired harmonics, as already suggested above, can be eliminated therefrom by suitable selection of actual electrode numbers of rotors and stators. The output voltage is free from distortion caused by the aforementioned fringe capacities, and is accordingly more precise than that of the transducer of the above-mentioned article, while being obtained by a transducer which is easier to fabricate.

It is further possible to achieve further reduction of noise factors and improvement of resolution of the transducer by subdividing electrode areas 44, 45, etc., into separate groups of electrodes. Such an electrode may for instance cover substantially 60 degrees of the circle and be insulated from the adjoining electrode by a dividing insulator line, the electrode pairs of the different groups being offset relative to one another by a certain angle $\delta_R$. Example: A first group may cover the sector from angle zero to angle 59°29' of the rotor; a second group reaches, with electrodes of same size and arrangement, to 120°0'; and so on. The angle $\delta_R$ of setting off of one such group relative to the next must not be an integral multiple of $R/n$; it is then possible further to suppress harmonics. Desirably the following relation is maintained:

(D) $$pn\delta_R = (2s+1)\pi$$

wherein $s$ equals zero, 1, 2, etc., and it then becomes possible to approximate precise sinusoidal form of the output voltage with particular accuracy, to suppress for instance, a seventh harmonic which may not be suppressed by the other expedients described above, and further to weaken all other harmonics.

It can readily be shown that, by means of the first embodiment of the electrode spacing principle of this invention, close approximation to a truly sinusoidal output voltage is obtained, on sinusoidal driving of the stator, if the rotor electrode spacing equals $\alpha'_R = 4°$ and $\gamma'_R = 9°26'40''$, while the stator has 36 partial electrodes in areas 25, 26. The noise factor then amounts only to $\frac{1}{40}$ of the original value, the third, fifth and ninth harmonics being eliminated and the seventh greatly weakened.

It will however be understood that a great variety of other groupings of partial electrodes can be used, always with the radial dividers described, which can produce substantially sinusoidal output functions.

I claim:

1. A shaft-position indicating device comprising rotor and stator elements closely opposed, one of said elements having first and second pairs of electrodes, one pair being radially outward of the other, the members of each pair of electrodes being in the form of coplanar conducting areas separated by straight insulating lines lying on radii of the shaft with alternate areas interconnected to form meshed electrode pairs, insulating lines on one pair being out of alignment with insulating lines on the other, and the other of said elements comprising conducting areas separated by straight insulating lines lying on radii of the shaft, each such conducting area on said other element being of a length to face both pairs of electrodes on the first element, means to impress alternating voltages of constant phase difference on the respective pairs of electrodes of the first element, so that the phase of the voltage induced in the areas of said other element varies in accordance with the shaft rotation, and means to indicate the phase of the voltage capacitatively induced in said other element.

2. The transducer of claim 1 wherein the rotor and stator elements are insulating discs having conducting coatings, the conducting areas being formed by radial lines of removal of the coatings connected by alternated inner and outer connecting lines of removal.

3. The transducer of claim 1 wherein the insulating lines are differently spaced on the two elements.

4. The transducer of claim 1 wherein the spacing of the insulating lines is non-uniform on at least one of the elements.

5. The transducer of claim 1 wherein said conductive areas on at least one of said elements are distributed about the axis of rotation in non-uniformly spaced groups.

6. A shaft-position indicating device comprising rotor and stator elements closely opposed, one of said elements having a first set of electrodes annularly disposed about the axis and a second set of electrodes annularly disposed about the axis outwardly of the first set, said electrodes all having their boundaries on radial straight lines, the electrodes of the respective sets being angularly displaced with respect to each other, the second of said elements having a third set of electrodes annularly disposed about the axis, said electrodes also having their boundaries on radial straight lines, and being of radial extent to face both sets of the electrodes on the first element, means to impress alternating voltages of constant phase difference on the respective first and second sets of electrodes on the first member, and means to measure the phase of the voltage capacitatively induced in the third set of electrodes on the second member.

References Cited in the file of this patent

UNITED STATES PATENTS

| | | |
|---|---|---|
| 2,671,892 | Childs | Mar. 9, 1954 |
| 2,674,729 | Carter | Apr. 6, 1954 |
| 2,799,002 | Morel | July 9, 1957 |